(No Model.)
J. A. EDDY.
TEDDER.
No. 379,454. Patented Mar. 13, 1888.
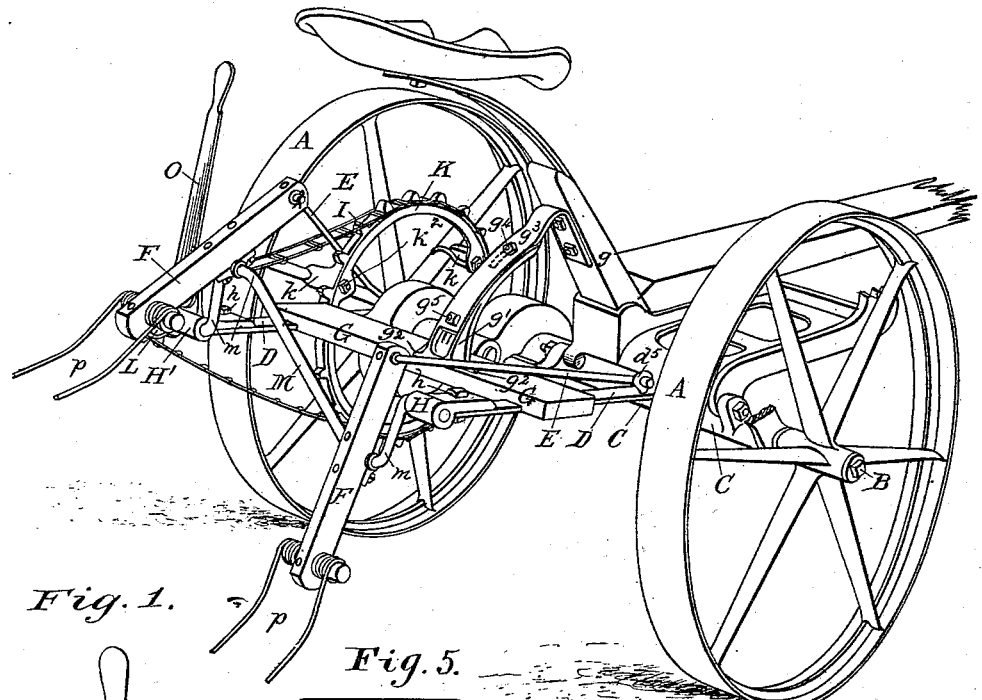
Fig. 1.
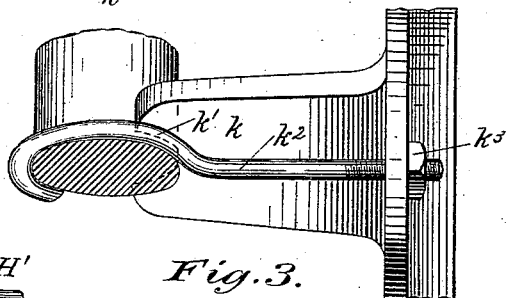
Fig. 5.
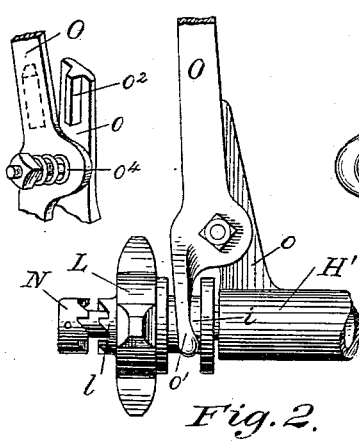
Fig. 2.
Fig. 3.
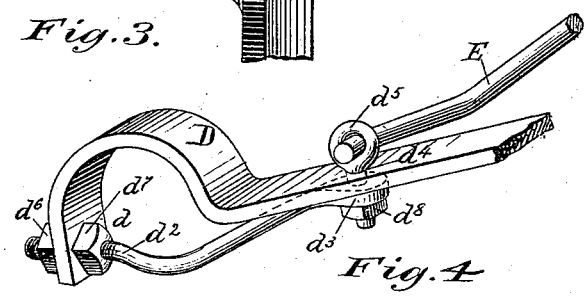
Fig. 4.
WITNESSES=
Walter W. Lovegrove
George E. Wilcox.
INVENTOR
James A. Eddy.
by Hinsdill Parsons,
his attorney.

UNITED STATES PATENT OFFICE.

JAMES A. EDDY, OF TROY, NEW YORK.

TEDDER.

SPECIFICATION forming part of Letters Patent No. 379,454, dated March 13, 1888.

Application filed October 24, 1887. Serial No. 253,276. (No model.)

*To all whom it may concern:*

Be it known that I, JAMES A. EDDY, a citizen of the United States, residing at Troy, county of Rensselaer, and State of New York, have invented certain new and useful Improvements in Combined Mowers and Hay-Tedders, of which the following is a full, clear, and accurate description, reference being had to the accompanying drawings, forming part of this specification.

My invention consists in pivoting the tedder-frame at its forward end upon the mower-axle and in rigidly supporting the frame at its rear end from the seat-standard, which is mounted in the tongue-frame, pivoted concentrically, or nearly so, with the axle. By this arrangement the tedder-teeth, reaching as far forward as the line of tread of the wheels, or nearly so, follow the inequalities of the ground, the vertical play of the pole does not interfere with the operation of the tedder, and the necessity of a caster-wheel to support the tedder at its rear end is obviated.

Referring to the drawings, in which similar letters of reference indicate like parts, Figure 1 is a rear perspective view of a machine embodying my invention; Fig. 2, an elevation of the clutch mechanism for controlling the tedder; Fig. 3, a sectional perspective of the sprocket-wheel for driving the tedder, and also one of the spokes of the mower driving-wheels; Fig. 4, a perspective view of the forward end of one of the tedder side frames, showing its attachment to the mower-frame. Fig. 5 is a bottom plan view of the rear end of the tedder side frames.

A A are the driving and carrying wheels of a mowing-machine, loosely mounted on the axle B, inclosed by the tubular frame C. The side frames, D D, of the tedder are formed of flat bars of iron turned or bent at their forward ends so as to fit over the tubular frame C. The side frames are provided at their forward ends with the holes $d\ d$, through which pass the curved eyebolts $d^2\ d^2$, the eye $d^3$ registering with the hole $d^4$, through which and the eyebolt passes the eyebolt $d^5$, which receives one end of the link E, secured at its other end to the tedding-arm F. The nuts $d^6$ $d^7\ d^8$ secure the eyebolts in proper place, and the tedder-frame is permitted a pivotal play around the tubular mower-frame. The side frames are rigidly secured together by the cross-sill G, and extending backwardly therefrom carry the boxes H H', in which revolves the tedder crank-shaft. The ends of the side frames are slotted longitudinally to receive the bolts $h\ h$, (see Fig. 5,) by which construction the boxes, together with the tedder crank-shaft, may be moved toward or away from the mower drive-wheels, to loosen or tighten the sprocket-chain I. To the cross-sill G, beneath the seat-standard $g$, is bolted the standard $g'$ with the flanges $g^2$. The standard $g'$ is bolted to the arm $g^3$, bolted to the seat-standard J, and the arm $g'$ being slotted longitudinally to receive the bolts $g^4\ g^5$. The tedder-frame may be adjusted to any desired distance from the ground by loosening the nuts on $g^4$ and $g^5$. The standard $g'$ and arm $g^3$ are curvilinear in form, their radii being their distances from the frame on which the tedder is pivoted.

To the driving-wheel farthest from the cutting apparatus is secured the sprocket-wheel K, on which are cast three or more lugs or ears, $k$, having the groove $k'$, which fits over the spoke of the wheel. The hook-bolt $k^2$ passes around the outer side of the spoke, and the nut $k^3$, being screwed up tightly, secures the sprocket-wheel to the mower-wheel. It is evident from this construction that when the sprocket-wheel is attached to the mower-wheel the two are concentric, and must always remain so. The sprocket-chain I runs over the wheel K and the small sprocket-wheel L, loosely mounted on the crank-shaft M. The sprocket-wheel L is provided with the clutch-teeth $l$, which take into corresponding clutch-teeth formed on the collar N, secured to shaft M. A lever, O, pivoted to an ear, $o$, projecting upwardly from the box H', has a downwardly-extending fork, $o'$, which takes into a groove, $i$, in the sprocket-wheel L. The ear $o$ has a lug, $o^2$, and the lever O has a corresponding lug, which locks the lever in position, it being held against jar by the spiral spring $o^4$. By moving the lever one way or the other the sprocket-wheel L is brought into engagement with the clutch N, thus causing the crank-shaft to revolve, or is permitted to run idly on the shaft.

The crank-shaft M has the two oppositelyextending cranks m, on which are pivoted, at about the middle of their length, the tedder-arms F, having the tedder-forks p at their lower ends, and having pivoted thereto at their upper ends the links E, pivoted in the eyebolts $d^5$. The links E should be of sufficient length to cause the tedder-forks to reach far enough forward to pick up the hay at or near the line of tread of the wheels, in order that should the wheels sink in a dead-furrow the forks may follow and may pick up the hay. The forks are made sufficiently elastic to pass any obstruction which they may encounter and spring back to place.

Having now described my invention, what I claim as new, and desire to secure by Letters Patent, is—

1. The combination, with the axle of a mowing-machine, of the tedder-frame pivoted thereto at its forward end, and supported at its rear end by a dependent arm secured to the seat-standard and to the tedder-frame, whereby the tedder is rigidly supported at the required distance from the ground, substantially as and for the purpose specified.

2. The tedder-frame pivoted on the axle of the mowing-machine at its forward end, and adjustably supported at its rear end by a dependent arm secured to the seat-standard and to the tedder-frame, substantially as and for the purpose specified.

In witness whereof I have hereunto set my hand this 17th day of October, 1887.

JAMES A. EDDY.

Witnesses:
HINSDILL PARSONS,
DANFORTH GEER.